Aug. 27, 1929.

B. B. GILLETT

OPEN END WRENCH

Re. 17,417

Original Filed Dec. 21, 1925

INVENTOR
Benjamin B. Gillett.
BY
Wm. Brown
ATTORNEY

Reissued Aug. 27, 1929.

Re. 17,417

UNITED STATES PATENT OFFICE.

BENJAMIN B. GILLETT, OF KANSAS CITY, MISSOURI, ASSIGNOR TO BLUE POINT TOOL COMPANY, OF CHICAGO, ILLINOIS, A CORPORATION OF ILLINOIS.

OPEN-END WRENCH.

Original No. 1,626,809, dated May 3, 1927, Serial No. 76,694, filed December 21, 1925. Application for reissue filed April 24, 1929. Serial No. 357,873.

My invention relates to open end wrenches and has for its principal object to provide a device of this type wherein a flat sided nut or bolt head may be received by its angular, transverse diameter without interference from the wrench at its other dimension and in a manner to hold the nut or bolt head more firmly than is possible with the ordinary wrench of this type.

In accomplishing this object I have provided improved details of structure, the preferred forms of which are illustrated in the accompanying drawings wherein:—

Referring more in detail to the drawings:—

1 designates the wrench, comprising a handle 2, having a head 3 at each end, although the double arrangement is not an essential of the invention.

Opening through the outer end of the head 3 is a socket 4 of a width but slightly greater than that of the particular sized nut or bolt head with which the wrench head is adapted for use, so that such a nut or bolt head may be received into the socket and held between the flat sides 5 of the socket 4 with a minimum of lost motion.

Figure 2:
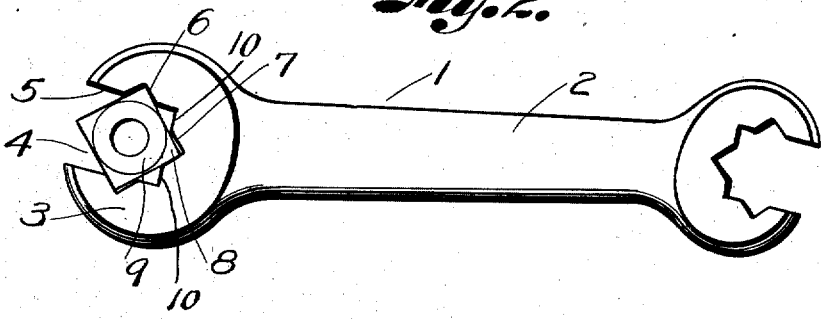
Fig. 2 is a similar view, illustrating use of the wrench with a square nut.

In the flat sides 5, about midway of the depth of the socket are opposite V notches 6 of a depth to receive opposite angles of a nut or bolt head when the latter is arranged with its angular diameter transverse of the socket, the bottom of the socket being recessed to receive an angle of a square nut or the corresponding facet of a hexagonal nut. The recess in the base of the socket preferably constitutes a V notch 7 similar to the notches 6 in the sides of the socket to receive the angle 8 of a square nut 9 (Fig. 2) the end wall 10 being perpendicular to the sides 5, as clearly shown in Fig. 2.

A wrench, constructed as described, is not only adapted for use in locations where it would be inconvenient, if not impossible, to employ a wrench of the ordinary open end type making 90° shifts on square nuts or 60° on hexagonal nuts, but is of increased advantage even where plenty of turning space is available, because of the firmer locking grip of the wrench on the nut or bolt head when the angles of the latter are located in the notches in the walls of the wrench.

Figure 3:
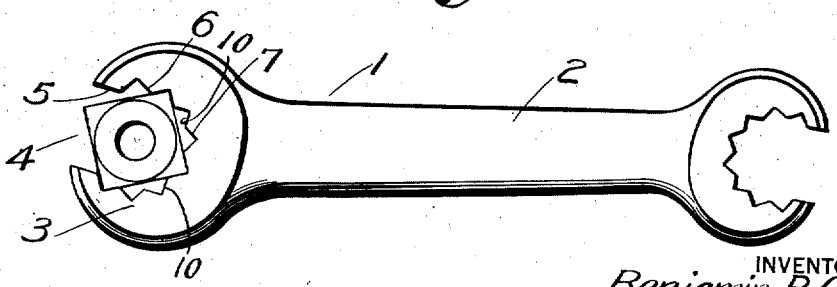
Fig. 3 is a similar view of a modified form of wrench adapted for use with a square nut.

In the modified form shown in Fig. 3, I provide each side of the wrench socket with two equally spaced notches 6 and the base of the socket with two equally spaced notches 7 for receiving the angles of a nut or bolt head so that when a nut or bolt head is located in the socket, one of its angles is located in an outer notch and an opposite angle at one side of the socket in an inner notch at the opposite side of the socket, the angular transverse diameter of the nut or bolt head extending diagonally across the perpendicular of the socket.

It is to be noted that certain of the nut corner engaging notches such as designated by numeral 7 in Figure 3, in this instance two, lie within the zone of the socket throat opening 4 and/or handle 2 to enable the axial application of the socket to the nut, thereby affording at least a double bite thereon within a more or less restricted range of handle movement. As a consequence the throat opening 4 although sufficiently restricted in width to require axial registry of the notched socket with the nut, permits the lateral application of the wrench over a pipe or rod which may be in threaded engagement with the correspondingly threaded axial bore of the nut. Thus the wrench may be slipped over a pipe and axially applied to the nut thereon to impart a true turning effect thereto rather than exert a spreading urge on the jaw socket. These undesirable spreading forces are prevalent in open-ended wrenches which possess sufficient throat breadth to enable lateral application directly to a nut. Insecure gripping, excessive wear and similar short-comings of the usual open end wrench are entirely avoided with open-end axially applied wrenches of the type hereinabove described.

Figure 1:
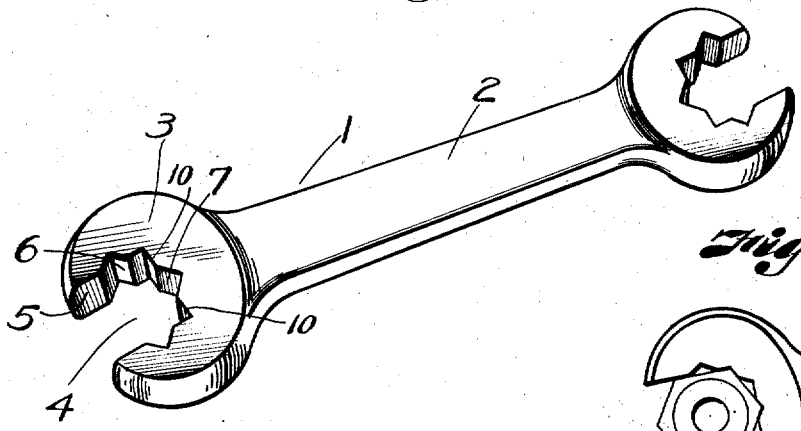
Fig. 1 is a detail perspective view of a wrench embodying my improvements.
Figure 4:
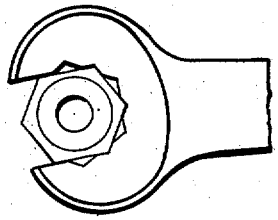
Fig. 4 is a similar view, showing a wrench adapted for use with a hexagonal nut.

With this arrangement I am able to effect manipulation of the nut with a shorter swing of the wrench; i. e., with a reversible wrench having a handle set at an angle of 7½° to the center line of the throat, the wrench can be operated with a 15° movement of the handle. In the same manner the wrench shown in Fig. 4 may be operated with a 15° movement of the handle. In the form shown in Fig. 2, with the handle set at an angle of 11¼° to the center line of the throat, the wrench can be operated with a 22½° movement of the handle.

It is apparent, therefore, that my improvement renders the wrench especially adapted for use in locations, such as on bridges, on building steel work, or in other places where structural steel is used and wherein it is frequently necessary to operate a wrench within a limited range of movement.

What I claim and desire to secure by Letters Patent is:

1. In an open end wrench, a head comprising a socket having parallel side walls extending through the head to the outer edge thereof to form a throat, said walls having opposite V-shaped notches, and an end wall substantially perpendicular to the walls of said throat, said end wall having a V-shaped notch therein.

2. In an open end wrench, a head comprising a socket having parallel side walls extending through the head to the outer edge thereof, said walls each having a plurality of V-shaped notches to receive the angles of a nut or bolt head, and an end wall substantially perpendicular to the walls of said throat, said end wall having a plurality of notches therein, said V-shaped notches being arranged symmetrically relative to the longitudinal center line of said socket.

3. In an open-ended wrench, the combination with a wrench head having a socket extending transversely therethrough, of nut corner engaging recesses or notches extending around the periphery of said socket for the entire depth thereof, there being a throat opening in said head between the periphery thereof and said socket, said throat opening being sufficiently restricted to require axial registry of said notched socket with the nut, said notches being equally spaced except for the opening and of such number that at least two notches lie in the zone of the opening.

In testimony whereof, I affix my signature.

BENJAMIN B. GILLETT.